Patented Sept. 29, 1925.

1,555,170

UNITED STATES PATENT OFFICE.

JOHN P. TRICKEY, OF EVANSTON, ILLINOIS, ASSIGNOR TO THE QUAKER OATS COMPANY, OF CHICAGO, ILLINOIS, A CORPORATION OF NEW JERSEY.

FOOD PRODUCT.

No Drawing. Application filed February 2, 1921. Serial No. 441,785.

*To all whom it may concern:*

Be it known that I, JOHN P. TRICKEY, a citizen of the United States, residing at Evanston, in the county of Cook and State of Illinois, have invented new and useful Improvements in Food Products, of which the following is a full, clear, concise, and exact description, reference being had to the accompanying drawing, forming a part of this specification.

My invention relates to food products and it has especial relation to cereal products which are precooked and subsequently dried.

More particularly my invention relates to a product of the above character and a method of preparing the same whereby it may be stored for a comparatively long time without developing a rancid taste and odor. The prevention of this type of deterioration forms one of the most acute problems of the cereal industry because the demand for precooked products is quite wide and it is necessary in order to satisfy this demand that the product be in such state that it can be stored for a considerable length of time while it is being commercially marketed.

This problem has been relieved to some extent in certain cereals by degerminating or otherwise extracting the bulk of the oil, but there are other cereals such, for instance, as oats, which are so constituted that the elimination of the oil therefrom is not feasible. Precooked products prepared from oats, and other cereals having analogous characteristics, are therefore quite liable to develop rancidity during storage and great difficulty has heretofore been experienced in keeping such foods for any length of time without the development of a rancid odor or taste therein, which development, of course, precludes the marketing and use of the product.

In my research in the precooked cereal field I have discovered that the development of rancidity takes place very much more rapidly in the smaller particles of the food product, probably because of the relatively larger amount of surface which is exposed to the action of air and light, it being presumed that rancidification of a product is predicated on the exposure of that element therein which tends to rancidify by contact with light, heat and moisture.

Food products of the above type usually consist of comparatively large particles mixed with a lesser quantity of fine particles, particularly meal, flour or dust. I have discovered that, by eliminating the fine particles just referred to from the precooked product, the keeping quality of the cereal is greatly improved inasmuch as the occurrence of rancidity during storage is greatly delayed if not entirely prevented.

A product having the above described characteristics may be obtained by screening, sifting or otherwise eliminating particles of a predetermined size from the aggregate. In this way only those particles remain which have a very small surface area as compared with their mass or volume and the tendency to rancidify is therefore greatly reduced.

While I have described but one method of eliminating the rancidity generating material from precooked cereal, the gist of the invention resides in the discovery that the relatively fine particles of the food mass contribute, in a very large measure, to the development of rancidity in said mass and therefore cause precooked foods as above described to become unsuitable as an edible product after a comparatively short storage period. In view of these facts, I desire that my invention be broadly interpreted and be limited only by the showing of the prior art and by the scope of the appended claims.

Having thus described my invention, what I now claim as new and desire to secure by Letters Patent, is:

1. The method of preventing the rancidification of a precooked cereal product which comprises eliminating the fine particles of said product from the cereal.

2. The method of preventing the rancidification of a precooked cereal product which comprises forming the particles of said product with as small a surface and as large a mass as is consistent with the desirable characteristics of said product.

3. The method of preventing the rancidification of a precooked cereal product which consists in eliminating the fine particles from said product and leaving only those particles which have the smallest surface area as compared with their mass and whose size is consistent with the desired characteristics of said product.

In witness whereof, I have hereunto subscribed my name.

JOHN P. TRICKEY.